United States Patent
Mazhar

[11] Patent Number: 5,566,987
[45] Date of Patent: Oct. 22, 1996

[54] HOSE FITTING ASSEMBLY

[76] Inventor: Mohammad S. Mazhar, 3537 Jasper Dr., Sterling Heights, Mich. 48310

[21] Appl. No.: 489,518
[22] Filed: Jun. 12, 1995
[51] Int. Cl.$^6$ .............................. F16L 37/10; F16L 37/18
[52] U.S. Cl. ........................... 285/86; 285/307; 285/314; 285/315; 285/308
[58] Field of Search ................................... 285/307, 308, 285/316, 314, 315, 81, 91, 86

[56] References Cited

U.S. PATENT DOCUMENTS

| | | | |
|---|---|---|---|
| 3,507,523 | 4/1970 | Cadley | 285/307 |
| 4,709,454 | 12/1987 | Barnes | 285/307 |
| 5,230,538 | 7/1993 | Kobayashi | 285/316 |
| 5,343,892 | 9/1994 | Saito | 285/316 |
| 5,447,342 | 9/1995 | Mazhar | 285/307 |

FOREIGN PATENT DOCUMENTS

| | | | |
|---|---|---|---|
| 86404 | 1/1959 | Denmark | 285/307 |
| 2106694 | 5/1972 | France | 285/307 |

Primary Examiner—Eric K. Nicholson
Attorney, Agent, or Firm—Peter A. Taucher; David L. Kuhn

[57] ABSTRACT

A hose fitting assembly has a fitting, a spool that translates into the fitting and a sleeve sliding along the spool onto the fitting. The fitting has a bore, an exterior channel, and apertures connecting the exterior channel to the bore. Disposed at the apertures are elements radially intrudable into the bore. An ring-like spring in the channel keeps these elements at the apertures and biases them into the bore. A bevelled part of the spool forces the intruding elements and spring out from the bore as the spool's plunger portion sealingly slides in the bore. The sleeve coacts with outward motion of the spring to lock the spool to the fitting, the sleeve aligned in its locking position on the fitting by a shoulder on the fitting.

11 Claims, 4 Drawing Sheets

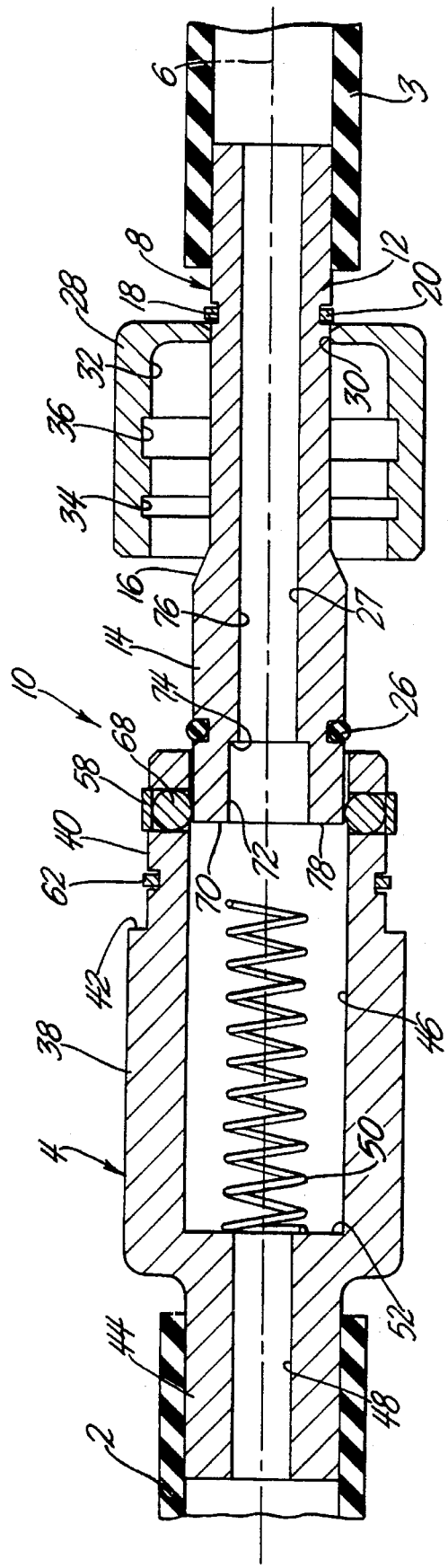
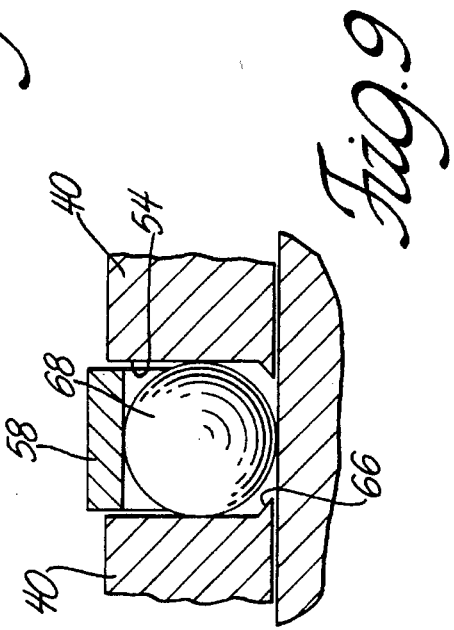
Fig. 8
Fig. 9

HOSE FITTING ASSEMBLY

GOVERNMENT USE

The invention described here may be made, used and licensed by or for the U.S. Government for governmental purposes without paying me royalty.

BACKGROUND OF THE INVENTION

One of the US Army's primary logistical concerns is the efficient operation and maintenance of thousands of combat and tactical vehicles. Each vehicle has numerous hydraulic or pneumatic hoses that typically must be disconnected and later reconnected in the course of regular maintenance. Additionally, specialized trucks and trailers often have hose or lines that are connected and disconnected during normal operations. Also, US Army depots where vehicles are serviced in some cases utilize equipment requiring hose connections and disconnections for its use. Consequently, a considerable number of man hours are spent by the US Army each year simply in connecting and disconnecting hoses. It is thus desirable to find hose coupling devices that require the least amount of time to use.

SUMMARY OF THE INVENTION

My invention is a hose fitting assembly that allows quick, straight motions when coupling or decoupling the components of the assembly. The assembly has a female fitting which defines a cylindrical bore, an annular channel about the fitting's exterior and apertures communicating the annular channel to the bore. Balls, teeth or like intrusive elements are positioned at the apertures and are intrudable through the apertures into the bore. A spring girding the fitting keeps the intrusive elements in the channel at the apertures.

The hose fitting assembly also includes a spool whose plunger portion sealingly translates into and out of the bore. A sleeve that slides along the spool mates with the exterior of the female fitting. When the sleeve is mated to the fitting, the spool is translated so that a bevel on the spool forces the intruding elements and the spring outward into an internal channel of the sleeve. The engagement of the spring in the sleeve's inner channel stops relative translation of the sleeve and the female fitting.

The hose fitting assembly further includes an external shoulder on the female fitting. The shoulder limits axial sliding of the sleeve onto the female fitting and aligns the internal sleeve channel with the spring.

BRIEF DESCRIPTION OF THE DRAWINGS

FIGS. 2 and 4 are partly sectioned to better show internal elements of the assembly.

FIGS. 2A through 6A are sectioned side elevational views corresponding to FIGS. 2 through 6, respectively.

FIG. 8 is a fully sectioned side elevational view of the assembly. The elements of the assembly are in the same relative positions as seen in FIG. 1.

FIG. 9 is an enlarged detail view of the spring, ball and channel shown in FIG. 8.

DETAILED DESCRIPTION

Figure 7:
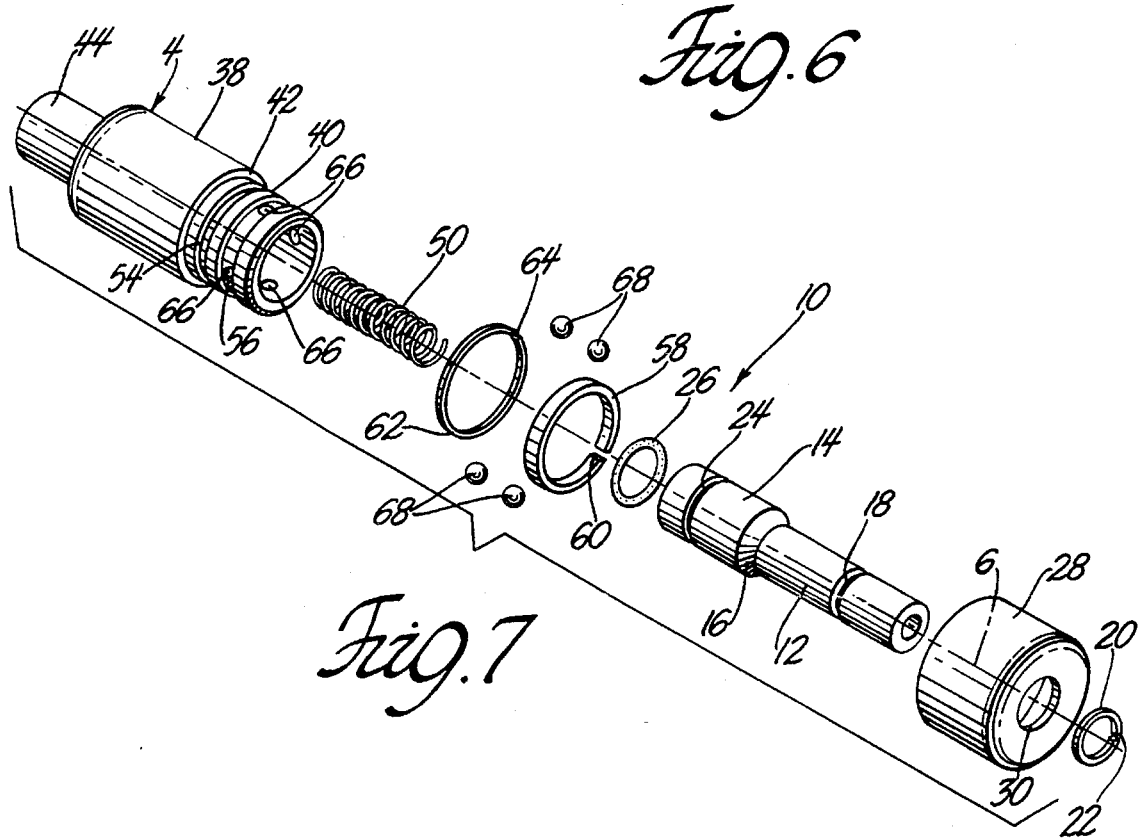
FIG. 7 is an exploded perspective view of the assembly.

FIGS. 7 and 8 show hose fitting assembly 10 centered on axis 6 and provided with female fitting 4 which receives a hollow spool 8. Standard hoses (shown at 2 and 3 in FIG. 8) can be fit onto elongate tubular section 12 of spool 8 and onto hose insertion tube 44 of fitting 4. Spool 8 includes a plunger section 14 that fits closely and slidably in fitting 4, plunger section 14 having a larger diameter than tubular section 12. Integrally connected between sections 12 and 14 is annular bevel 16. Tubular section 12 has annular groove 18 accommodating an elastically deformable sleeve carrier 20, which is typically a circular spring or clip having circumferential gap 22. Plunger section 14 has an annular groove 24 which accepts an elastomeric ring seal 26. Spool 8 defines a stepped bore 27 therethrough having a larger diameter portion 72 in plunger section 14 connected to a smaller diameter portion 76 extending to and through tubular section 12. Translatable along tubular section 12 is cup-like sleeve 28, one axial end of the sleeve having aperture 30 sized diametrically to fit closely but not interferingly with tubular section 12. Within sleeve 28 is inner peripheral or inner diametrical surface 32 (FIG. 8) defining inner channels 34 and 36 centered on axis 6.

Figure 1:
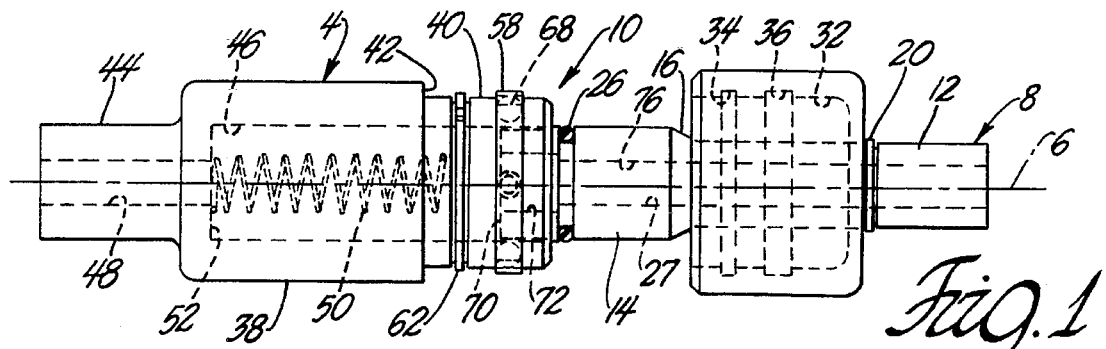
FIGS. 1 through 6 are all side elevational views of the hose fitting assembly, these figures showing juxtapositions of the assembly's fitting, spool and sleeve at consecutive stages of the assembly's operation.

Female fitting 4 has a generally cylindrical barrel portion 38, a barrel extension 40, an external shoulder 42 between portion 38 and extension 40, and hose insertion tube 44. As seen in FIGS. 1 and 8, fitting 4 defines therein a cavity, preferably in the form of straight cylindrical bore 46 communicated to a diametrically smaller bore 48 passing through hose insertion tube 44. A coil spring 50 is disposed within bore 46 coaxially therewith. Spring 50 is typically affixed to axial end face 52 of bore 46 where it opens to bore 48, or else fixed to surface 72 in bore 72.

The exterior of barrel extension 40 defines annular channel 54 (FIG. 7) that accommodates an elastically deformable brake in the form of detent 62, which is typically a circular spring or clip having circumferential gap 64. Detent 62 is sized to interfere with inner diametrical surface 32 of sleeve 28, whereby detent 62 inhibits translation of sleeve 28 over barrel extension 40. As seen in FIG. 7, the exterior of extension 40 also defines channel 56, which typically has a wide flat radial cross section and which has four apertures 66 at equally angular intervals. The number of apertures 66 can vary and apertures 66 need not be round. Apertures 66 may be of any shape so long as they allow radial movement into bore 46 of intruding elements such as teeth, studs or balls 68. Preferably, the apertures act as seats for balls 68 and these balls protrude into extension 40 when set in apertures 66. Trapping the balls in channel 56 is a ribbon-like flat circular spring 58 having a circumferential gap 60. Alternatively, balls 66 or other intruding elements may be fixed to spring 58.

In order to use hose fitting 10 it is first necessary to slide sleeve 28 onto spool 8, and then place carrier 20 in groove 18 and place seal 26 in groove 24. Spring 58 will already be trapping balls 68 in apertures 68 and detent 62 will already be in channel 54.

To proceed with connection of fitting 10, spool 8 is pushed into female fitting 4 as shown in FIGS. 1 and 8, so that intruding end 70 of the spool forces balls 68 radially outward against the bias of spring 58, as detailed in FIG. 9. Carrier 20 abuts sleeve 28 so that sleeve 28 translates toward fitting 4 as spool 8 is inserted therein.

Figure 2:
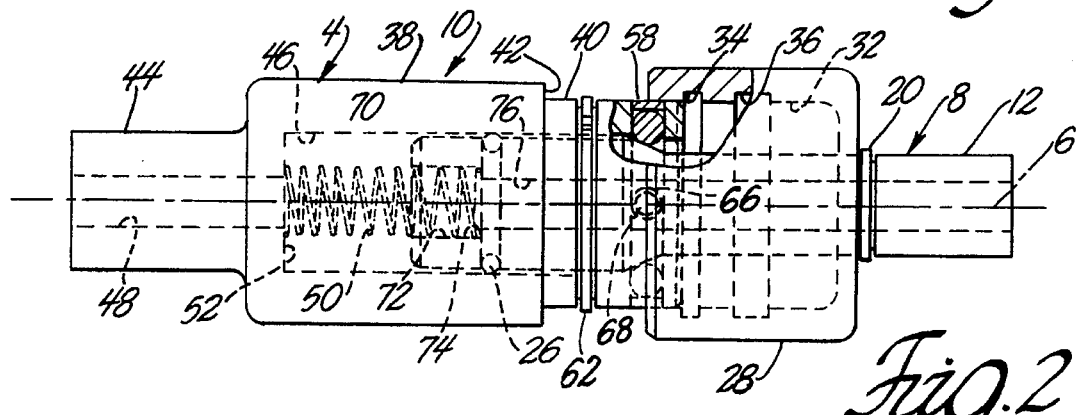

Spool 8 is then pushed further into fitting 4, until bevel 16 is past balls 68, whereupon the bias of spring 58 forces balls 68 radially inward. Once spring 58 has forced balls 68 inward, spring 58 is flush with, or recessed with respect to, the exterior surface of barrel extension 40. Consequently, sleeve 28 passes freely over spring 58 as spool 8 continues to be pushed into fitting 4, as seen in FIG. 2. In FIG. 2, the free end of spring 50 enters outer bore 70 of plunger 14 and contacts shoulder 74 thereof.

Spool 8 continues to be pushed into fitting 4, so that sleeve 28 interferes with but passes over detent 62 and so that spring 50 is compressed. Designs to allow sleeve 28 to pass over detent 62 and then interfere with detent 62 are within the ordinary skill of those in the hose coupling art and are not part of my invention. Such designs may include appropriate dimensioning of the sleeve or detent, bevels on the sleeve or detent, or appropriate flexibility of the sleeve or detent. Detent 62 will hold sleeve 28 axially motionless on extension 40 unless spool 8 is manually pushed further into fitting 4 or is manually pulled out of fitting 4. As a consequence, detent 62 may be regarded as an overidable or defeasible brake for 8 preventing relative axial sliding between sleeve 28 and barrel extension 40. Preferably, carrier 20 is stronger and less easily deformable than detent 62 so that carrier 20 continues to carry sleeve 28 further onto barrel extension 40 as sleeve 28 interferingly passes over detent 62.

Figure 3:
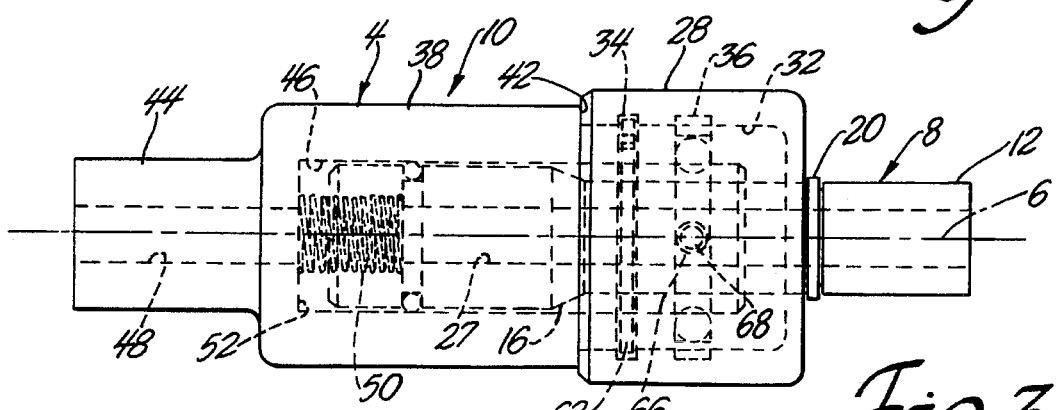

As seen in FIG. 3, when sleeve 28 abuts external shoulder 42 of barrel portion 38, spring 58 axially aligns with inner channel 36 of sleeve 28. At the same time detent 62 axially aligns with the sleeve's inner channel 34 and then protrudes into channel 34. Consequently, shoulder 42 is a means to locate sleeve 28 so as to align spring 58 and detent 62 with respective channels 36 and 34. Shoulder 42 also acts as a positive, indefeasible stop or limiter preventing sleeve 28 from being carried further onto female fitting 4 than shown in FIG. 3. Note that the only motion needed thus far by a person using assembly 10 has been a straight axial push on spool 8.

Figure 4:
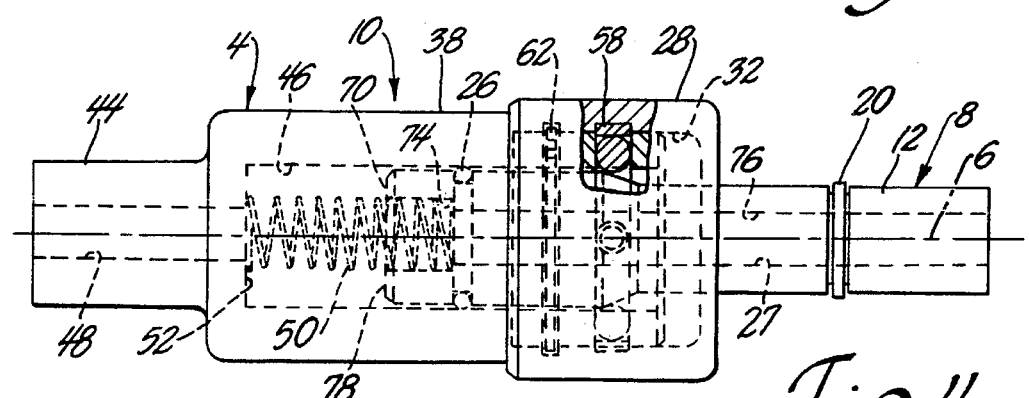
Figure 2A:
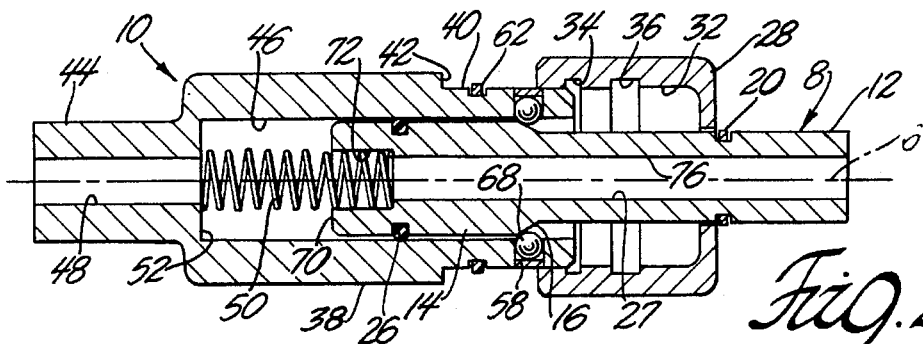
Figure 3A:
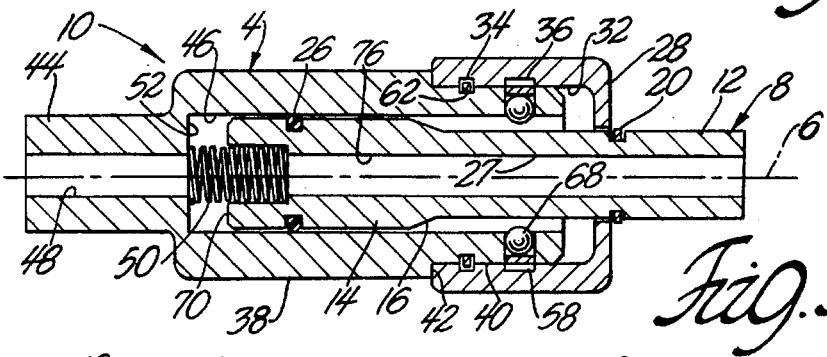
Figure 4A:
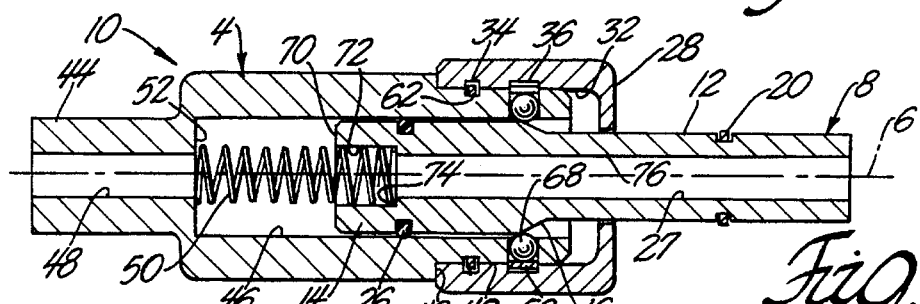
Figure 6A:
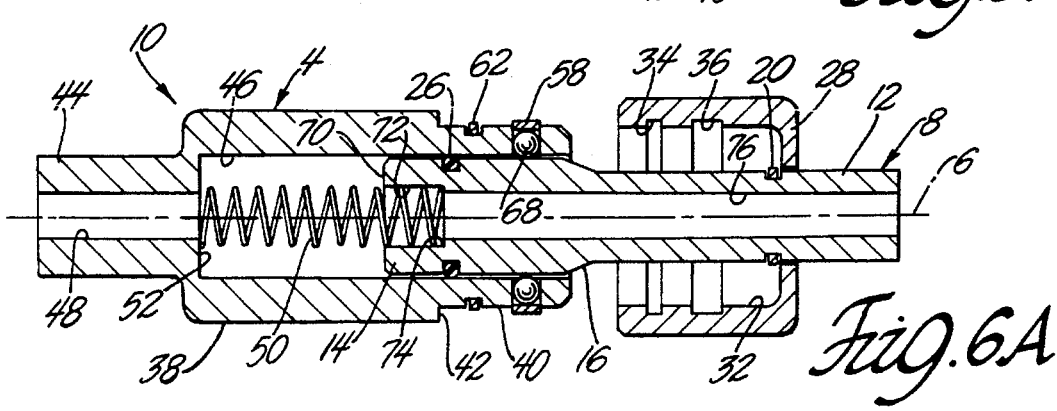

Spool 8 is now released, whereupon spring 50 decompresses and pushes spool 8 axially outward, or left in FIGS. 3 and 4, while the engagement of detent 62 in channel 34 keeps sleeve 28 stationary relative to fitting 4. The spool is pushed by spring 50 until the spool's annular bevel 16 engages balls 68 and forces them radially outward as seen in FIG. 4, and the balls in turn force spring 58 into channel 36. The depth of channel 36 is less than the radial thickness of spring 58, whereby the radially outer portion of spring 58 fits in channel 36 but the radially inner portion of spring remains in channel 56 (FIG. 7) of barrel extension 40. Consequently, spring 58 in its FIG. 4 position locks sleeve 28 in an axially fixed position relative to barrel extension 40, so that female fitting 4 and spool 8 are positively connected together. In another manner of speaking, bevel 16, balls 68, spring 58, channel 56 and channel 36 cooperate to arrest axial sliding of sleeve 28 on barrel extension 40.

When pressurized fluid thereafter flows through hose fitting assembly 10, the fluid will exert pressure on the spool's axially facing shoulder 74 and on the spool's axially facing end surface 78. This pressure, together with the bias of spring 50, prevents spool 8 from translating further into fitting 4, or left in FIG. 4. As a result, bevel 16 remains engaged with balls 68, spring 58 continues its locking action and spool 8 remains positively connected to fitting 4. Hence, shoulder 74 and surface 78 act as a mechanism to assist the positive connection between spool 8 and fitting 4 when pressurized fluid flows through assembly 10.

Figure 5A:
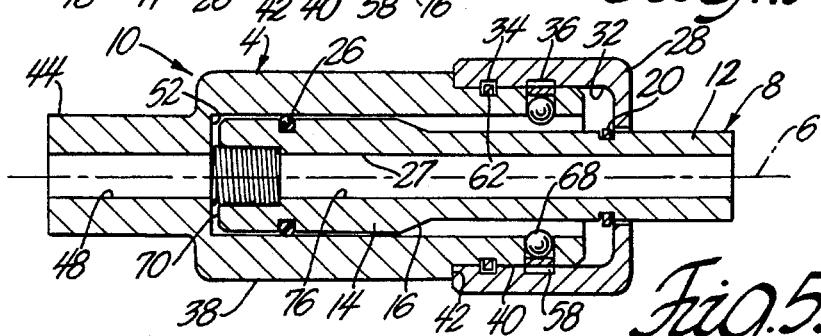
Figure 5:
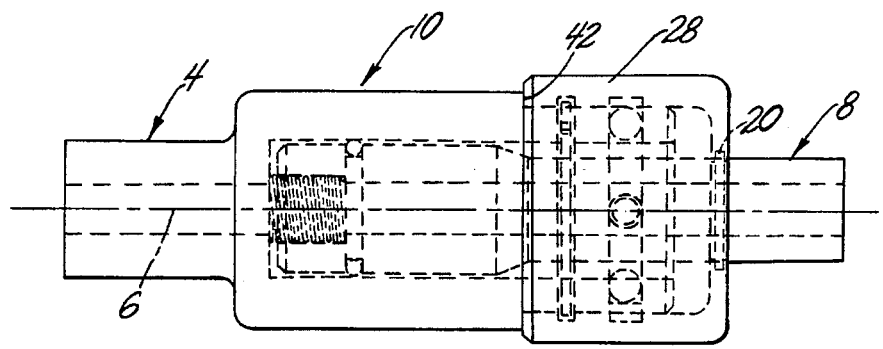
Figure 6:
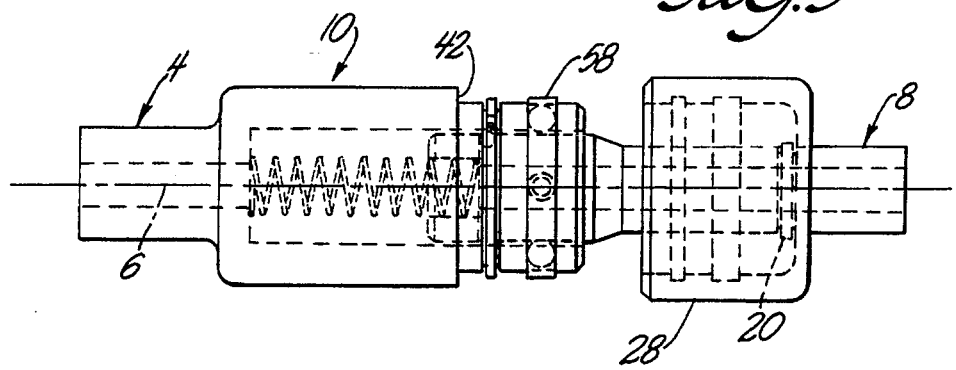

To disconnect spool 8 from fitting 4, one first relieves the pressure in assembly 10 and then pushes spool 8 further into fitting 4, or to the left as seen in FIG. 4. Bevel 16 disengages from balls 68, whereupon spring 58 is allowed to contract and clear channel 36 so as to discontinue the spring's lock with sleeve 28. One pushes until sleeve 28 abuts external shoulder 42 and until carrier 20 has interferingly passed through the sleeve's aperture 30 as seen in FIG. 5. Then spool 8 is pulled out from fitting 4, or to the right in FIG. 5. Sleeve 28 is carried outward with spool 8 because of the engagement between sleeve 28 and carrier 20. Pulling continues until assembly 10 has the configuration seen in FIG. 6. From the FIG. 6 position spool 8 is simply pulled the rest of the way out of fitting 4. Note that only straight axial motions of spool 8 are needed to disconnect assembly 10.

I wish it to be understood that I do not desire to be limited to the exact details of construction or method shown herein since obvious modifications will occur to those skilled in the relevant arts without departing from the spirit and scope of the following claims.

What is claimed is:

1. A hose fitting assembly for quickly connecting or disconnecting hose ends, comprising:

a fitting defining a cavity;

an aperture connecting the cavity to an exterior surface of the fitting;

a mobile intruding element positioned at the aperture;

means for keeping the intruding element at the aperture, the keeping means disposed on the fitting;

a spool;

a plunger portion of the spool sealingly slidable in the cavity;

a sleeve slidable on the spool and slidable onto the fitting, the sleeve having an inner peripheral surface configured to fit around the fitting; and means for arresting translational motion of the sleeve relative to the fitting, the arresting means including means for forcing both the intruding element and keeping means radially outward;

means for preventing relative axial motion between the fitting and the sleeve, the preventing means and arresting means being different structures;

means for carrying the sleeve with the spool such that spool translation moves the sleeve axially relative to the fitting, thereby overriding the preventing means;

means for limiting axial carriage of the sleeve with the spool.

2. The assembly of claim 1 further comprising means for biassing the spool axially outward of the cavity as the sleeve is carried onto the fitting.

3. The assembly of claim 1 wherein the arresting means comprises:

an exterior channel on the fitting wherein the aperture is open to the exterior channel and the keeping means is disposed at least partly in the exterior channel; and an interior channel in the sleeve configured to accommodate at least a portion of the keeping means;

wherein the limiting means is also means for aligning the interior channel with the exterior channel.

4. The assembly of claim 1 wherein the forcing means includes a bevel around the spool and the keeping means includes a trapping spring about the fitting.

5. The assembly of claim 3 wherein a shoulder on the fitting is the limiting means and the aligning means.

6. The assembly of claim 1 wherein the sleeve defines a hole in contact with the spool and the carrying means is interferingly passable through the hole.

7. A hose fitting assembly for quickly connecting or disconnecting hose ends, comprising:

a fitting having an axis and having a bore along the axis;

an exterior channel defined about the fitting;

a channel aperture between the exterior channel and the bore;

an intruding element positioned at the channel aperture, the intruding element radially mobile relative to the axis;

means for keeping the intruding element at the channel aperture, the keeping means including a spring at the external channel;

a spool;

a plunger portion of the spool sealingly slidable in the bore;

a sleeve slidable along the spool, the sleeve having a surface configured to fit with the barrel extension;

means on the spool for forcing the intruding element and the spring radially outward against a bias of the spring;

means acting in concert with radially outward motion of the spring for arresting relative axial sliding of the sleeve and the barrel extension; and means for aligning the arresting means with the spring, the aligning means comprised of a shoulder defined on the fitting.

8. The assembly of claim 7 wherein the spool comprises a tubular portion on which slides the sleeve and wherein the forcing means has a bevel about the spool integrally connected between the plunger portion and the tubular portion.

9. The assembly of claim 8 further comprising:

an axial end of the sleeve faced away from the fitting, the axial end defining a sleeve aperture in sliding contact with the tubular portion of the spool; and means for carrying the sleeve with the spool as the spool translates, the carrying means interferingly passable through the sleeve aperture.

10. The assembly of claim 9 further comprising;

means for preventing relative axial motion between the fitting and the sleeve, the preventing means comprising a brake sized to interferingly fit between the sleeve and the fitting;

wherein sufficient axial translation of the spool moves the sleeve axially relative to the fitting, thereby overriding the preventing means.

11. A hose fitting assembly using only straight axial motions for quickly connecting or disconnecting hose ends, comprising:

a longitudinal axis of the assembly;

a female fitting defining a cylindrical bore centered on the axis;

a barrel portion of the female fitting;

a barrel extension of the female fitting having a smaller diameter than the barrel portion;

a shoulder defined between the barrel portion and the barrel extension;

an exterior annular channel about the female fitting;

channel holes communicating the exterior annular channel to the bore;

balls in the exterior channel disposed at the channel apertures;

means for keeping the balls at the apertures, the keeping means including a trapping spring at least partly in the exterior channel;

a spool;

a plunger portion of the spool sealingly slidable in the bore;

a tubular portion of the spool having a smaller diameter than the plunger portion;

means on the spool for forcing the balls and the trapping spring radially outward against the bias of the trapping spring, the forcing means comprising an annular bevel integrally connecting the plunger portion to the tubular portion;

a sleeve translatable along the tubular portion, the sleeve having a cylindrical inner peripheral surface configured to closely fit upon the barrel extension, the sleeve defining a first inner annular channel configured to accommodate a radially outer portion of the trapping spring;

an axial end of the sleeve faced away from the female fitting, the axial end defining a sleeve aperture in sliding contact with the tubular portion of the spool;

means for carrying the sleeve with the spool as the plunger portion translates axially into the bore, the carrying means being a ring-like element interferingly passable through the sleeve aperture;

means for biasing the spool axially outward of the bore as the sleeve is carried onto the fitting; and means weaker than the carrying means for preventing relative axial motion between the female fitting and the sleeve, the preventing means comprising an annular brake disposed on the barrel extension between the exterior annular channel and the shoulder, the brake sized to interferingly fit between the sleeve and the female fitting, the preventing means further comprising a second inner annular channel defined by the sleeve and sized to accommodate the brake.

* * * * *